(No Model.)
H. M. SHAW.
PIPE RING.
No. 338,445. Patented Mar. 23, 1886.
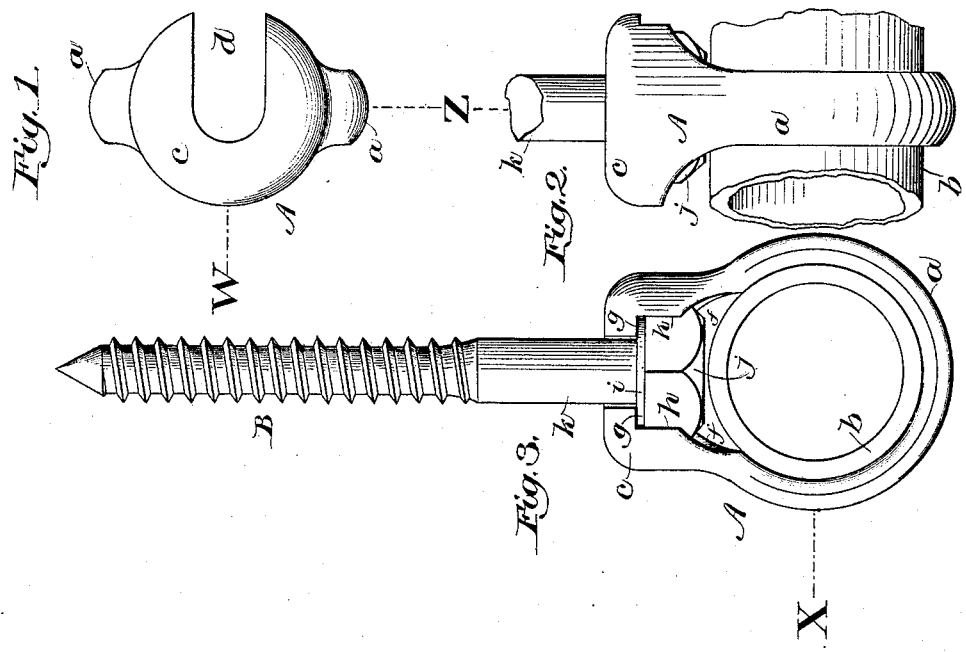
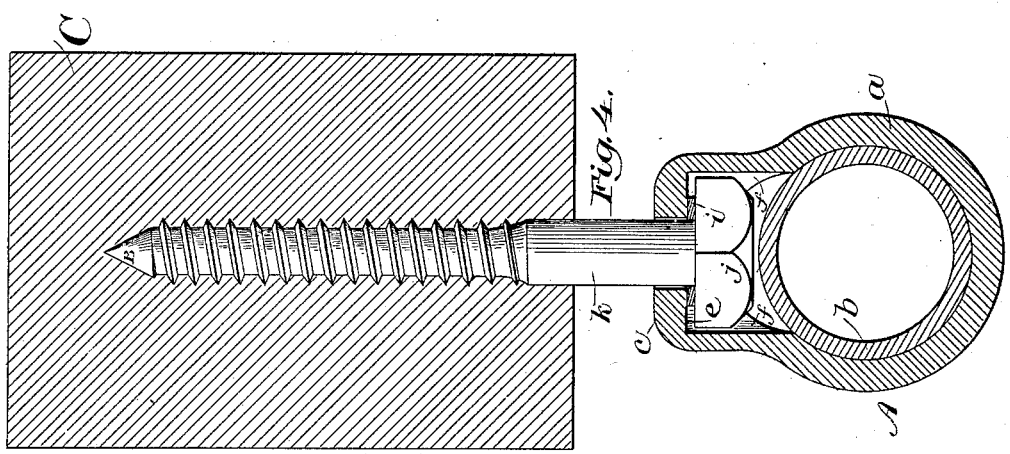
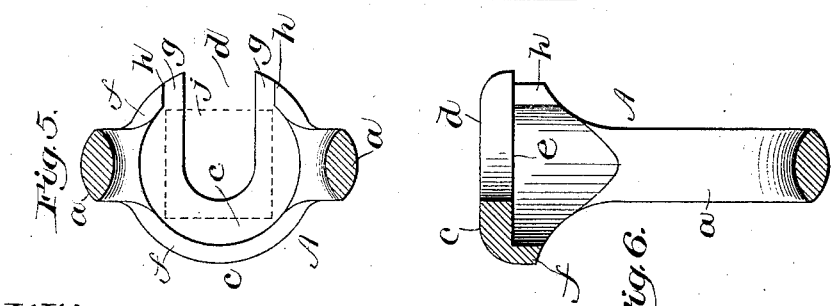
Witnesses
A. O. Orne
Eugene Humphrey
Inventor
Harry M. Shaw
per T. W. Porter, Atty

UNITED STATES PATENT OFFICE.

HARRY M. SHAW, OF BOSTON, MASSACHUSETTS, ASSIGNOR TO THE WALWORTH MANUFACTURING COMPANY.

PIPE-RING.

SPECIFICATION forming part of Letters Patent No. 338,445, dated March 23, 1886.

Application filed May 16, 1885. Serial No. 165,771. (No model.)

*To all whom it may concern:*

Be it known that I, HARRY M. SHAW, of Boston, in the county of Suffolk and State of Massachusetts, have invented a new and useful Improvement in Pipe-Rings, which will, in connection with the accompanying drawings, be hereinafter fully described, and specifically defined in the appended claim.

This invention has for its object the production of a ring for supporting lines of pipe, and so constructed as to be secured in position by a lag-screw or bolt, and to be easily adjustable in relative height, in order to effect the desired vertical alignment of the pipe thereby supported, as will, in connection with the accompanying drawings, be hereinafter fully described and particularly claimed.

In said drawings, Figure 1 is a top plan view of my improved ring. Fig. 2 is an edge elevation of the same, with a portion of the securing-bolt in place therein. Fig. 3 is a side elevation taken as at the right in Fig. 1, with the securing-bolt or lag-screw and the supported pipe in place therein. Fig. 4 is a vertical section taken as on line Z, Figs. 1 and 2, but showing the pipe in transverse section, the lag-screw in elevation, and the supporting-beam, in which the screw is inserted, in transverse vertical section. Fig. 5 is a sectional inverted plan view of my ring, the section being taken as on line X, Fig. 3, and the view being as from below that line. Fig. 6 is a vertical section taken on line W, Fig. 1.

In these views, A represents my improved ring. B is a lag-screw, by which it is supported, and C is a beam in which said screw is shown as inserted. Said ring is formed with circular portion $a$, within which the supported pipe $b$, is inserted. At the top of the ring is a broadened portion, $c$, having formed therein an open slot, $d$, to receive stem $k$ of screw B, as shown by solid lines in Figs. 2, 3, 4. Said broadened part $c$ has formed upon its inner face a circular flange or rib, $f$, connecting with the narrower portion $a$, and terminating at $h\ h$, so as to leave a portion, $g\ g$, between such terminations $h$ and the open slot $d$, as is clearly shown in Fig. 5. Within said flange $f$ is the seat $e$, on which head $j$ of screw B is seated. Said seat $e$ and the head $j$ of screw B have such relative proportions that said head turns freely within flange $f$, and may be so rotated, by applying a pipe-wrench to its stem $k$, so as to rectify the vertical alignment of the pipe after it is in place in the rings; and the space between ends $h$ of flanges $f$ has such relation to screw-head $j$ that when pipe $b$ is in the ring the latter may, by sliding it on the pipe, be released from head $j$, when the latter is so turned that its parallel sides are parallel with the side lines of slot $d$, as shown by dotted lines in Fig. 5; but when the pipe $b$ is in the rings, and the screw is so turned that the diagonal line of head $j$ is parallel with the side lines of slot $d$, as shown in Figs. 3, 4, the ring is positively locked and secured upon screw B.

A washer, $i$, is shown as arranged on stem $k$ of the screw, to facilitate the turning of head $j$ when its corners cross slot $d$, but said washer is not indispensable.

That semicircular portion of rib $f$ which is on the side of flattened portion $c$ of the ring opposite slot $d$ serves to strengthen the remaining part of $c$ that is not cut away by the slot, while the short arcs $f$, terminating at $h\ h$, serve as the actual stops to prevent removal of the ring from the lag-screw when the head of the latter is in the diagonal position shown in Figs. 3 and 4.

As my ring is easily cast in perfected form, it is inexpensive, while being convenient, effective, and readily adjusted by actuating screw B, as stated.

I claim as my invention—

A pipe-supporting ring formed with a circular portion to receive the pipe to be thereby sustained, a flattened portion having an open slot to receive the stem of the supporting-screw, and a seat to receive the head of said screw, and having stops formed upon said flattened portion outside said seat and at such distance from said slot that the space between the stops is less than the diameter of said seat, substantially as specified.

HARRY M. SHAW.

Witnesses:
JAS. M. ROBERTSON,
B. C. BARBEAU.